United States Patent
Onozawa

(10) Patent No.: US 7,515,816 B2
(45) Date of Patent: Apr. 7, 2009

(54) IMAGING APPARATUS HAVING A FOCUS FUNCTION

(75) Inventor: Masaru Onozawa, Akishima (JP)

(73) Assignee: Casio Computer Co., Ltd., Tokyo (JP)

( * ) Notice: Subject to any disclaimer, the term of this patent is extended or adjusted under 35 U.S.C. 154(b) by 420 days.

(21) Appl. No.: 11/299,211

(22) Filed: Dec. 8, 2005

(65) Prior Publication Data

US 2006/0127078 A1 Jun. 15, 2006

(30) Foreign Application Priority Data

Dec. 10, 2004 (JP) ............................. 2004-358066

(51) Int. Cl.
*G03B 17/18* (2006.01)

(52) U.S. Cl. .................... 396/80; 396/88; 396/287; 396/291; 396/296; 382/106

(58) Field of Classification Search ............... 396/291, 396/296, 287, 48, 80, 88; 382/106
See application file for complete search history.

(56) References Cited

U.S. PATENT DOCUMENTS

| | | | | |
|---|---|---|---|---|
| 4,011,571 A | * | 3/1977 | Okuzawa | 396/291 |
| 5,023,656 A | * | 6/1991 | Terashita | 355/41 |
| 5,083,150 A | * | 1/1992 | Nagasaki et al. | 396/49 |
| 5,266,985 A | * | 11/1993 | Takagi | 396/147 |
| 6,349,173 B1 | * | 2/2002 | Kanai et al. | 396/90 |
| 6,801,717 B1 | * | 10/2004 | Hofer | 396/121 |
| 2001/0010556 A1 | * | 8/2001 | Sugimoto et al. | 348/345 |
| 2005/0117026 A1 | * | 6/2005 | Koizumi et al. | 348/222.1 |
| 2005/0276596 A1 | * | 12/2005 | Chan et al. | 396/296 |
| 2006/0127078 A1 | * | 6/2006 | Onozawa | 396/103 |

FOREIGN PATENT DOCUMENTS

| | | |
|---|---|---|
| JP | 8-54558 A | 2/1996 |
| JP | 09-135416 * | 5/1997 |
| JP | 2003-75717 A | 3/2003 |

* cited by examiner

*Primary Examiner*—W. B. Perkey
*Assistant Examiner*—Michael A Strieb
(74) *Attorney, Agent, or Firm*—Frishauf, Holtz, Goodman & Chick, P.C.

(57) ABSTRACT

FIGS. 2A~2D are object display frames corresponding to respective portrait photography modes and distance information corresponding to respective portrait photography modes is stored in a distance information table of memory (Refer to FIG. 2E). When the user selects a portrait photography mode, an object display frame corresponding to the portrait photography mode is displayed on an image display section. The user can adjust the object to be photographed in this object display frame while observing the object display frame (Refer to FIG. 2F). Then, when the shutter button is depressed, the distance information corresponding to this selected portrait photography mode is read from the distance information table and the focus lens is driven based on the readout distance information.

22 Claims, 9 Drawing Sheets

FIG. 2A
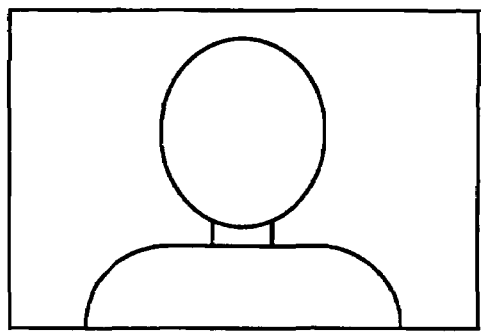
FIG. 2B
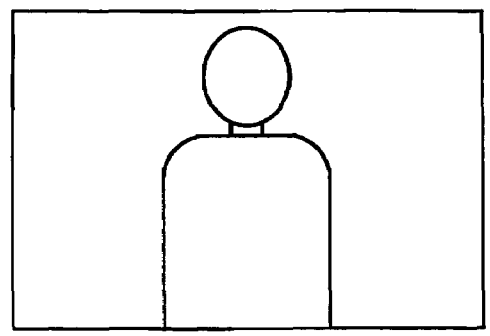
FIG. 2C
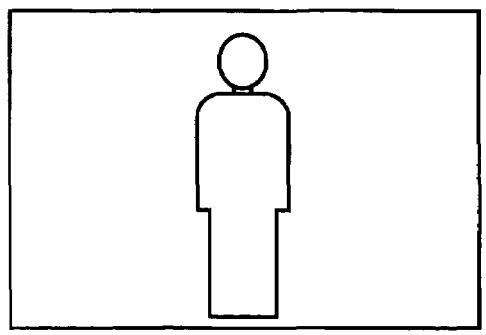
FIG. 2D
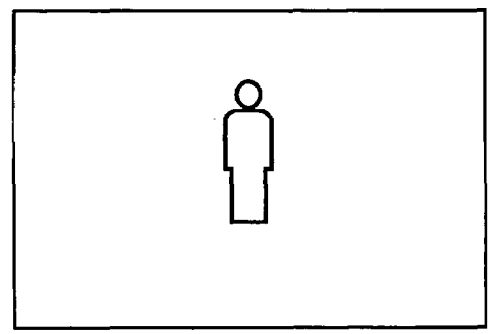
FIG. 2E
| PORTRAIT PHOTOGRAPHY MODE 1 | 0.5m |
| --- | --- |
| PORTRAIT PHOTOGRAPHY MODE 2 | 1.0m |
| PORTRAIT PHOTOGRAPHY MODE 3 | 2.0m |
| PORTRAIT PHOTOGRAPHY MODE 4 | 3.0m |
| ⋮ | ⋮ |
FIG. 2F
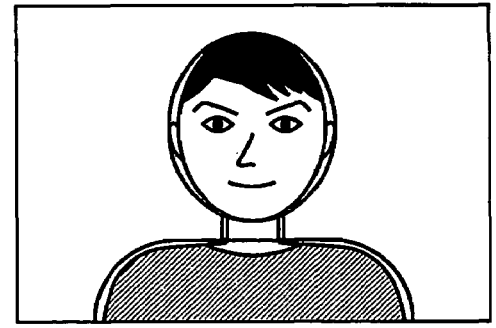

| PORTRAIT PHOTOGRAPHY MODE 1 | THREE POINT FOCUS POSITION FOR DEPTHS 0.3m~0.5m、 0.4m~0.5m、 0.5m~0.6m |
|---|---|
| PORTRAIT PHOTOGRAPHY MODE 2 | THREE POINT FOCUS POSITION FOR DEPTHS 0.7m~1.1m、 0.8m~1.2m、 0.9m~1.5m |
| PORTRAIT PHOTOGRAPHY MODE 3 | THREE POINT FOCUS POSITION FOR DEPTHS 1.5m~2.1m、 1.8m~2.5m、 2.0m~2.7m |
| PORTRAIT PHOTOGRAPHY MODE 4 | THREE POINT FOCUS POSITION FOR DEPTHS 2.5m~3.2m、 2.7m~3.4m、 3.0m~3.6m |
| ⋮ | ⋮ |

IMAGING APPARATUS HAVING A FOCUS FUNCTION

CROSS-REFERENCE TO RELATED APPLICATION

This application is based upon and claims the benefit of priority from the prior Japanese Patent Application No. 2004-358066 filed Dec. 10, 2004, the entire contents of which is incorporated herein by reference.

BACKGROUND OF THE INVENTION

1. Field of the Invention

The present invention relates to an imaging device and a focusing method comprising a focus function which can be implemented in digital cameras.

2. Description of the Related Art

Conventionally, in imaging apparatus such as digital cameras, distance information to an object is detected and Auto-Focusing (AF) processing by a phase difference detection method of combining focus to an object based on this detected distance information is generally known. This phase difference detection method detects distance to an object from an image by which the image focus is formed by a pair of sensor arrays according to the principle of triangulation ranging.

However, in AF processing according to this phase difference detection method is affected by light and darkness of the photographing environment. Therefore, when the photographing environment is dark, the object distance cannot be detected correctly and a focused image cannot be photographed.

Accordingly, the conventional prior art disclosed in Japanese Laid-Open (Kokai) Patent Application No. 2003-075717 titled "DISTANCE DETECTING DEVICE" was developed. In this technology, namely, the size (the number of pixels) occupied by a person's face on the photographic image plane is calculated for every distance to the object which is tabulated as a table in advance and stored in a memory in a ranging/focusing circuit 30. This ranging/focusing circuit 30 correlates the focus of an object by extracting a person's face from an imaging signal at the time of ranging, counting the number of pixels corresponding to the extracted imaging signal, calculating the object distance from the above-mentioned table and driving a focus lens according to the calculated object distance.

SUMMARY OF THE INVENTION

In accordance with an aspect of the present invention, there is provided an imaging apparatus, comprising an image pickup section for imaging an object; a setting section for setting a portrait photography mode; a display control section for displaying an object display frame on a display section corresponding to the portrait photography mode setting by the setting section; an acquisition section for acquiring focusing position information corresponding to the portrait photography mode setting by the setting section; and a focus control section for focusing on an object by moving a focus lens based on the focusing position information acquired by the acquisition section.

Also, in accordance with an aspect of the present invention, there is provided an imaging apparatus comprising an image pickup section for imaging an object; a setting section for setting a portrait photography mode; a display control section for displaying an object display frame on a display section corresponding to the portrait photography mode setting by the setting section; an acquisition section for acquiring object distance information corresponding to the portrait photography mode setting by the setting section; and a recording control section for recording the object distance information acquired by the acquisition section in a recording section.

In accordance with another aspect of the present invention, there is provided an imaging apparatus comprising an image pickup section for imaging an object; a setting section for setting a portrait photography mode; a display control section for displaying an object display frame on a display section corresponding to the portrait photography mode setting by the setting section; an acquisition section for acquiring object distance information corresponding to the portrait photography mode setting by the setting section; and wherein the display control section further displays the object distance information acquired by the acquisition section on the display section.

In accordance with another aspect of the present invention, there is provided an imaging apparatus comprising an image pickup means for imaging an object; a setting means for setting a portrait photography mode; a display control means for displaying an object display frame on a display section corresponding to the portrait photography mode setting by the setting means; an acquisition means for acquiring focusing position information corresponding to the portrait photography mode setting by the setting means; and a focus control means for focusing on an object by moving a focus lens based on the focusing position information acquired by the acquisition means.

In accordance with another aspect of the present invention, there is provided a focusing method comprising the steps of setting a portrait photography mode; displaying an object display frame on a display section corresponding to the set portrait photography mode; acquiring focusing position information corresponding to the set portrait photography mode; and focusing on an object by moving a focus lens based on the acquired focusing position information.

In accordance with another aspect of the present invention, there is provided a program documentation recording medium for storing a recording control program executed by a processor in an imaging device comprising the steps of imaging processing for imaging an object; setting processing for setting up portrait photography mode; display processing for displaying an object display frame corresponding to the portrait photography mode setting by the setting processing on a display section; acquisition processing for acquiring focusing position information corresponding to the portrait photography mode set by the setting processing; and focus processing for focusing on an object by moving a focus lens based on the focusing position information acquired by the acquisition processing.

The above and further objects and novel features of the present invention will more fully appear from the following detailed description when the same is read in conjunction with the accompanying drawings. It is to be expressly understood, however, that the drawings are for the purpose of illustration only and are not intended as a definition of the limits of the invention.

BRIEF DESCRIPTION OF THE DRAWINGS

FIG. 2A to FIG. 2F are diagrams explaining portrait photography modes and an object display frame of the present invention;

DETAILED DESCRIPTION OF THE PREFERRED EMBODIMENTS

Hereinafter, the preferred embodiments of the present invention will be described in detail with reference to the drawings.

A. First Embodiment

A-1. Configuration of the Digital Camera

Figure 1:
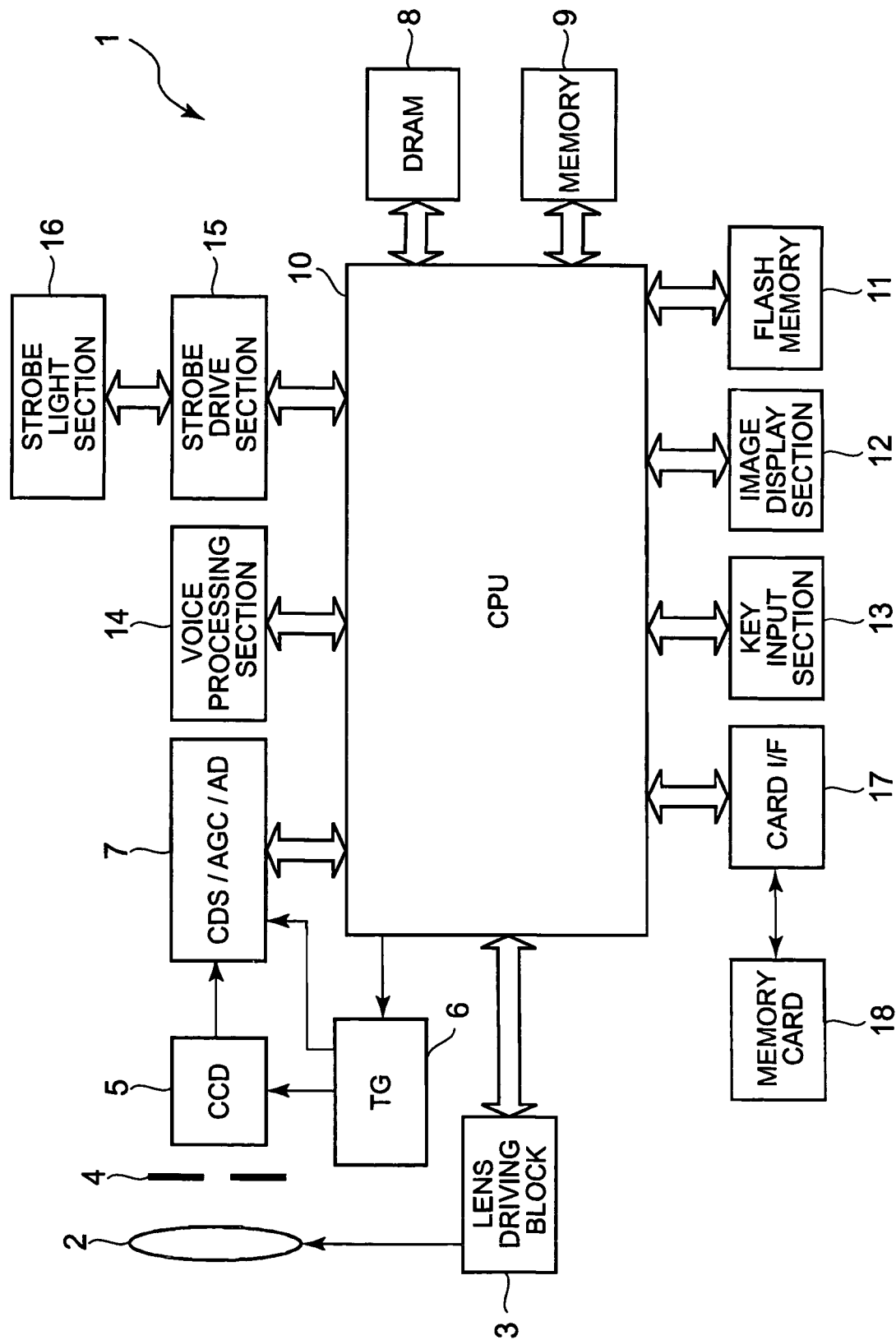
FIG. 1 is a block diagram of a digital camera in an embodiment of the present invention.

FIG. 1 is a block diagram showing the general electrical outline configuration of a digital cameral 1 which actualizes the imaging device of the present invention.

In FIG. 1, the digital camera 1 comprises an image pickup lens 2, a lens driver block 3, an aperture/shutter combination 4, a CCD 5, a timing generator (TG) 6, a unit circuit 7, a DRAM 8, a memory 9, a CPU 10, a flash memory 11, an image display section 12, a key input section 13, a voice processing section 14, a strobe driver section 15, a strobe light section 16 and a card I/F 17. In the card I/F 17, a memory card 18 can be connected which is installed easily in a removably attachable card slot of the digital camera 1 main body (not shown).

The image pickup lens 2 includes a focus lens and zoom lens (not shown) and connected to the lens driver block 3. The lens driver block 3 is configured with a motor for driving the focus lens and the zoom lens (not shown) in an optical axis direction, respectively. Also, a focus motor driver and a zoom motor driver are used to drive the focus motor and the zoom motor in an optical axis direction, respectively, according to control signals from the CPU 10.

The aperture/shutter combination 4 includes a drive circuit (not shown) which operates the aperture/shutter combination 4 according to control signals sent from the CPU 10. This aperture/shutter combination functions as both an aperture and a shutter.

The aperture functions as the mechanism to control the amount of light which enters the image pickup lens 2. The shutter functions as the mechanism to execute the time duration time for applying light to the CCD 5. The time duration for applying light to the CCD 5 changes according to the opening and closing speed of the shutter (shutter speed). Thus, an exposure can be determined according to this aperture and shutter speed.

The CCD 5 converts the light of an object projected via the image pickup lens 2 and the aperture/shutter combination 4 into an electrical signal and outputs to the unit circuit 7 as an imaging signal. In addition, the CCD 5 is driven according to a timing signal of a predetermined frequency generated by the TG 6. The unit circuit 7 is connected to the TG 6.

The unit circuit 7 is configured with a Correlated Double Sampling (CDS) circuit which performs and maintains correlated double sampling of the imaging signal outputted from the CCD 4, an Automatic Gain Control (AGC) circuit which performs automatic gain control of the imaging signal after sampling, and an A/D converter which converts the analog imaging signal after the automatic gain control into a digital signal. The imaging signal of the CCD5 is forwarded to the CPU 10 as a digital signal via the unit circuit 7.

The CPU 10 is a one chip microcomputer which controls each section of the digital camera 1. The CPU 10 has the functions of performing image processing of the image data sent from the unit circuit 7 (pixel interpolation processing, gamma (γ) correction, luminosity color difference signal generation, white-balance processing, exposure correction processing, etc.), as well as performs processing compression/expansion of image data (for example, compression/expansion in JPEG format and MPEG format) and the like.

The DRAM 8 is used as a working memory for the CPU 10 while being used as a buffer memory to temporarily store the image data sent to the CPU 10 after being picked up by the CCD 5.

The flash memory 11 and the memory card 18 are recording media for storing (saving) image data picked up by the CCD 5. In the present embodiment, although the writing (recording) of the image data using the flash memory 11 mainly is explained, whether to record the image data in the flash memory 11 or to record to the memory card 18 can be selected by operation of the key input section 13. The flash memory 11 and memory card 18 are equivalent to the recording means of the present invention.

The image display section 12 includes a color LCD and its driver circuit. During a photography standby state, an object imaged by the CCD 5 is displayed a through-image. At the time of reproduction, the recorded image is readout from the respective flash memory 11 or the memory card 18 for storage, expanded and the recorded image is displayed. This image display section 12 is equivalent to the display means of the present invention.

The key input section 13 includes a plurality of operation keys, such as a power key, a shutter button, zoom keys (telephoto key and wide angle key), a portrait photography mode key and a release key (cancellation key), etc. The manipulation signal corresponding to the user's keystroke operations is outputted to the CPU 10. This key input section 13 functions as the selection means of the present invention.

The voice processing section 14 includes a built-in microphone, an amplifier, an A/D converter, a D/A converter, an amplifier, a built-in speaker, etc. At the time of photographing an image with audio, the audio inputted into the built-in microphone is converted into a digital signal and sent to the CPU 10. The CPU 10 sequentially stores the sent voice/audio data in the buffer memory (DRAM 8) and while the image data is being picked up by the CCD 5 records to the flash memory 11 or the memory card 18.

In addition, at the time of reproduction of an image with audio, the voice processing section 14 performs sound emission of voice, audio, etc. from the built-in speaker based on the audio data attached to each image data.

The strobe driver section 15 provides the flash drive of the strobe light section 16 according to a control signal from the CPU 10 and the strobe light section 16 performs the flash of light for the strobe. The CPU 10 judges whether or not a photographic scene is dark by the CCD 5 output (or a photometry circuit which is not shown). In cases where judged that a photographic scene is dark and judged as performing photography (when the shutter button is depressed), the CPU 10 transmits a control signal to the strobe driver section 15.

A-2. Functions of the Digital Camera Configuration

Hereafter, the functions of the respective configurations of the digital camera 1 serving as the features of the present invention will be explained.

When the power of the digital camera 1 is turned "ON" by operation of the power key of the user's key input section 13, the CPU 10 begins imaging of an object according to the CCD 5. Then, image processing is applied to the object image data picked up by the CCD 5 and stored in the buffer memory (DRAM 8). Next, the image of the recorded image data is displayed on the image display section 12. This is commonly referred to as a through-image display.

When a through-image display is commenced, the CPU 10 judges whether or not operation of the zoom keys for the key input section 13 has been executed. This judgment judges whether or not a manipulation signal corresponding to operation of the zoom keys has been sent from the key input section 13 and when sent is judged that a zoom operation has been performed.

When judged that a zoom operation has been performed, the CPU 10 sends a control signal to the lens driver block 3 according to operation of the user's zoom key and the lens driver block 3 drives the zoom lens according to the received control signal (control means).

At this stage, when the user operates the telephoto key of the zoom keys, the CPU 10 sends a control signal which makes the zoom lens in the lens driver block 3 drive toward the object side and the lens driver block 3 drives the zoom lens toward the object side according to this control signal. In addition, when the wide angle key of the zoom keys is manipulated, the CPU 10 sends a control signal which makes the lens driver block drive the zoom lens toward the photographer side and the lens driver block 3 drives the zoom lens toward the photographer side according to this control signal.

Furthermore, the CPU 10 judges whether or not a portrait photography mode has been executed by the user. This judgment judges whether manipulation signal corresponding to operation of the portrait photography mode key has been sent from the key input section 13 and when sent is judged that selection of a portrait photography mode has been executed.

When the CPU 10 judges that selection of the portrait photography mode has been executed, the operation will perform by setting this selected portrait photography mode (setting means). This setting is performed by storing the information which indicates the selected portrait photography mode in the portrait photography mode storage area of the memory 9.

Here, there is a plurality of portrait photography modes. The user can select one of the optional portrait photography modes by manipulating the portrait photography mode key. When the portrait photography mode key is manipulated, the portrait photography mode will switch in sequence from 1. For example, by depressing the portrait photography mode key once will set the portrait photography mode 1. By manipulating the portrait photography mode key once again will switch to the portrait photography mode 2.

When setting the portrait photography mode, the CPU 10 will display an object display frame corresponding to the portrait photography mode on the image display section 12 (display control means).

FIG. 2A to FIG. 2F illustrate the appearance of object display frames corresponding to the portrait photography modes displayed on the display section 12. FIG. 2A shows an object display frame corresponding to the portrait photography mode 1. FIG. 2B shows the object display frame corresponding to the portrait photography mode 2. FIG. 2C shows the object display frame corresponding to the portrait photography mode 3. FIG. 2D shows the object display frame corresponding to the portrait photography mode 4. The object display frames corresponding to the portrait photography modes are recorded in the memory 9 beforehand.

In addition, when setting a portrait photography mode, the CPU 10 also judges whether or not a selection change of the portrait photography mode has been executed by the user. This judgment judges whether or not a manipulation signal corresponding to operation of the portrait photography mode key has been sent from the key input section 13, as well as judges whether or not a portrait photography mode has been selected. When this signal has been sent, the CPU 10 judges a selection change of a portrait photography mode has been executed.

Also, when judged a selection change of a portrait photography mode has been executed, the CPU 10 renews the setting of the portrait photography mode according to the user's keystroke operation. In other words, the information indicating the portrait photography mode already stored in the portrait photography mode storage area is overwritten with information indicating the newly selected portrait photography mode and stored.

Here, the user performs adjustment of the camera position and adjustment of the zoom magnification so that an object for performing photography currently displayed in the image display section 12 can be adapted to this object display frame currently displayed.

Additionally, when setting portrait photography mode, the CPU 10 judges whether or not to execute a cancellation of the portrait photography mode setting. This judgment judges whether or not a manipulation signal corresponding to operation of the release key of the user's key input section 13 has been sent from the key input section 13. When this signal has been sent, the CPU 10 judges cancellation (release) of a portrait photography mode.

When judged that the portrait photography mode has been cancelled, the CPU 10 releases the setting of the set portrait photography mode and inhibits (prohibits) display of the object display frame displayed on the image display section 12. This setting release is performed by deleting the information indicating the portrait photography mode stored in the portrait photography mode storage area of the memory 9.

In addition, the CPU 10 judges whether or not the shutter button has been depressed by the user. This judgment judges whether or not a manipulation signal corresponding to a shutter button depression has been sent from the key input section 13. When this signal has been sent, the CPU 10 judges the shutter button has been depressed.

When judged the shutter button has been depressed, the CPU 10 judges whether or not setting of a portrait photography mode has been executed. When judged the shutter button has been depressed and setting of a portrait photography mode has been executed, the information (distance information) which indicates distance corresponding to the setting of a portrait photography mode is readout from a distance information table recorded in the memory 9 (acquisition means).

Here, FIG. 2E illustrates the contents of the distance information table stored in the memory 9. As seen in FIG. 2E, the distance corresponding to portrait photography mode 1 is 0.5 m; the distance corresponding to portrait photography mode 2 is 1.0 m; the distance corresponding to portrait photography mode 3 is 2.0 m; and the distance corresponding to portrait photography mode 4 is 3.0 m.

The method for determining the distance corresponding to the portrait photography mode currently recorded in the memory 9 is decided by the distance to that person (object). This is assuming that there is a person (object) currently displayed on the image display section 12 in the size equivalent to the object display frame corresponding to a portrait photography mode when the zoom magnification is ×1, namely, zoom has not been performed. Accordingly, as shown in FIG. 2A, when an object display frame is large the distance is shorter. Conversely, as shown in FIG. 2D, when an object display frame is small the distance is longer.

In addition, when judged the shutter button has been depressed and setting of a portrait photography mode has been executed, the CPU 10 performs acquisition of the zoom magnification from the current position of the zoom lens (first magnification acquisition means).

Then, the CPU 10 takes into consideration the zoom magnification and performs correction (correction means) of this readout distance information. When the zoom magnification is ×2 or ×3, this is an object in a farther position than the distance of this readout distance information. For example, as seen in FIG. 2F, when the young man (object) currently displayed on the image display section 12 at the size equivalent to the object display frame is imaged by zoom magnification ×1 and when imaged by zoom magnification ×3, the distance to the young man is different.

Correction of this distance information may be made to calculate distance information to an object (object distance information) from the readout distance information and the current zoom magnification, or may be made to a table stored in the memory 9 indicating the relationship of previous distance information and the zoom magnification.

Then, the CPU 10 acquires (acquisition means) this corrected object distance information, moves (focus control means) the focus lens to the position corresponding to the acquired object distance information, performs still image photography processing, correlates the acquired image data and object distance information, and records both in the flash memory 11.

Then, the CPU 10 displays an image of the image data and the object distance information recorded in the flash memory 11 on the image display section 12.

On the other hand, if judged that setting of a portrait photography mode has not been executed when the shutter button is depressed, the CPU 10 performs AF processing, performs still image photography processing and records the acquired image data to the flash memory 11. This AF processing is performed by AF processing according to a contrast detection method, AF processing according to a phase difference detection method, etc.

The memory 9 stores required programs for controlling each section and required data (distance information table, etc.) for controlling of each section of the digital camera 1 by the CPU 10. The CPU 10 functions as the imaging apparatus of the present invention by performing processing according to this program. This memory 9 functions as the storage means of the present invention.

A-3. Operation of the Digital Camera 1

Figure 3:
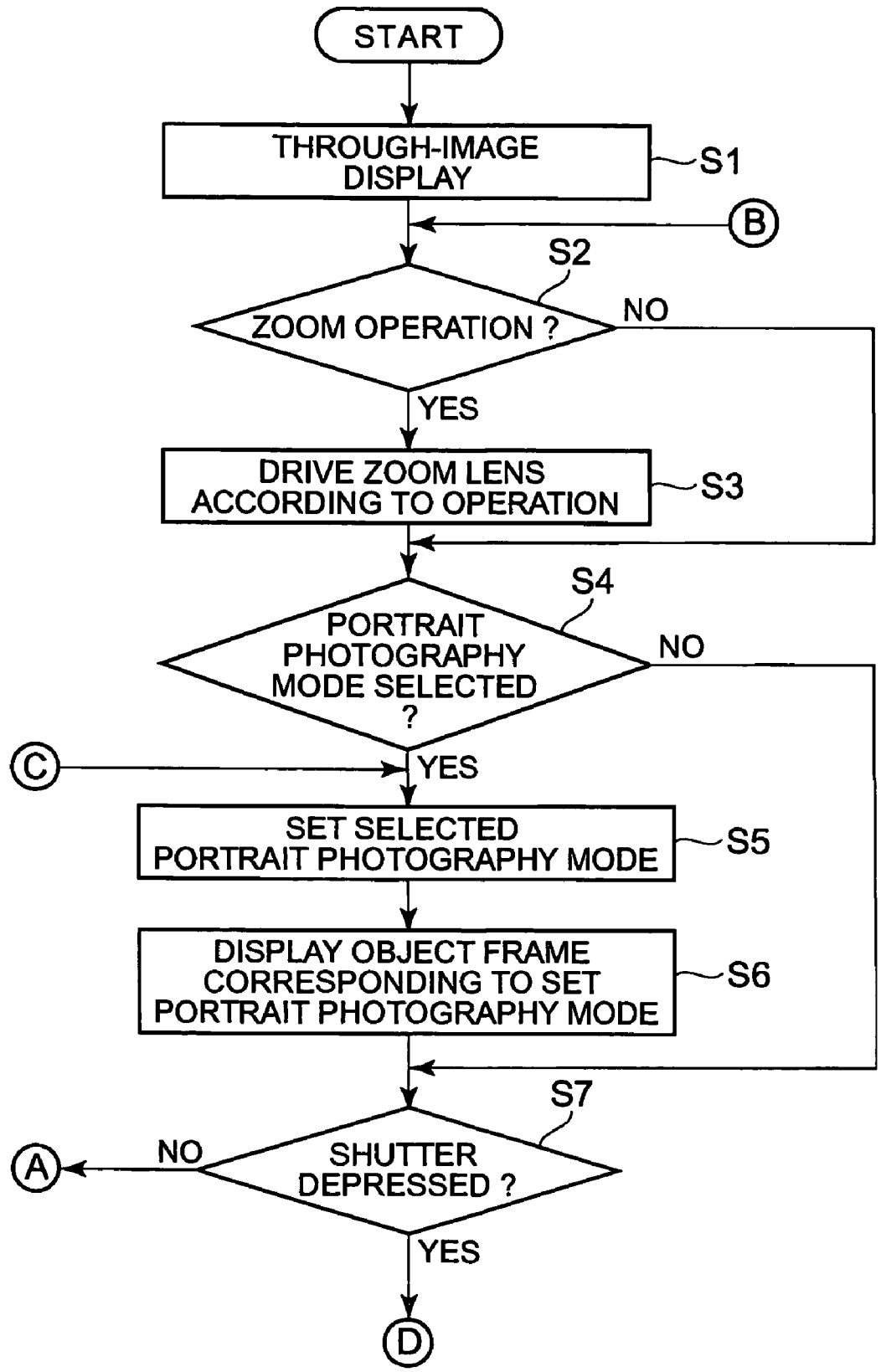
FIG. 3 is a flowchart showing operation of the digital camera in a first embodiment.

The operation of the digital camera 1 in the first embodiment will be explained according to FIG. 3 through FIG. 5 flowcharts.

First, when the power supply of the digital camera 1 is turned "ON" by operation of the power key of the user's key input section 13, imaging of an object commences by the CCD 5 and a through-image display commences, namely, a through-image of the imaged object is displayed on the image display section 12 (Step S1).

Next, the process judges whether or not manipulation of the zoom keys of the user's key input section 13 has been executed (Step S2). This judgment judges whether or not a manipulation signal corresponding to the manipulation of the zoom keys has been sent from the key input section 13 to the CPU 10.

At Step S2, when judged there has been manipulation of a zoom key, the zoom lens will be driven according to manipulation of a user's zoom key (Step S3) and the process advances to Step S4. For example, when the zoom telephoto key is manipulated, the zoom lens is driven in the direction toward an object along the optical axis and when the wide angle key is manipulated, the zoom lens is driven toward the photographer along the optical axis.

On the other hand, at Step S2, when judged there has been no manipulation of a zoom key, the process advances directly to Step S4.

When advancing to Step S4, the process judges whether or not selection of the portrait photography mode selection has been executed. This judgment judges that selection of the photography mode selection has been executed when a manipulation signal corresponding to manipulation of the portrait photography mode key has been sent from the key input section 13 by the manipulation of the portrait photography mode key of the input section 13 by the user.

Here, there is a plurality of portrait photography modes and the user can select one optional portrait photography mode by manipulating the portrait photography mode key. For example, the portrait photography mode switches in sequence from 1. When the portrait photography mode key is depressed once, the portrait photography mode 1 will be set. By depressing the portrait photography mode key once again will switch to the portrait photography mode 2. If the portrait photography mode key is manipulated in a situation where the last portrait photography mode has been selected, the portrait photography mode switches to the initial portrait photography mode 1.

Here, the portrait photography mode key has been depressed once.

Next, setting of the selected portrait photography mode according to the user's keystroke manipulation is executed (Step S5). Here, since the user depressed the portrait photography mode key once, the portrait photography mode 1 will be set.

Subsequently, an object display frame corresponding to the set portrait photography mode is displayed on the image display section 12 (Step S6). Here, since setting of the portrait photography mode 1 has been set, the object display frame displayed on the image display section 12 constitutes an object display frame such as that illustrated in FIG. 2A. At this stage, the through-image of an object imaged by the CCD 5 along with the respective object display frame is displayed on the image display section 12.

Here, the user can make adjustments by changing the position/height and zoom magnification of the digital camera 1 so that the object to be photographed fits exactly in the object display frame which is displayed on the image display section 12.

FIG. 2F shows a situation when an object is fitted exactly in an object display frame.

FIG. 2F shows a situation when the zoom magnification is ×3 and the object (a young man's upper half body) is fitted in the object display frame.

At Step S6, when the object display frame corresponding to the set portrait photography mode is displayed on the image display section 12, the process judges whether or not the shutter button has been depressed by the user (Step S7). This judgment judges whether or not a manipulation signal corresponding to a shutter button depression of the user's key input section 13 has been sent from the key input section 13.

Figure 4:
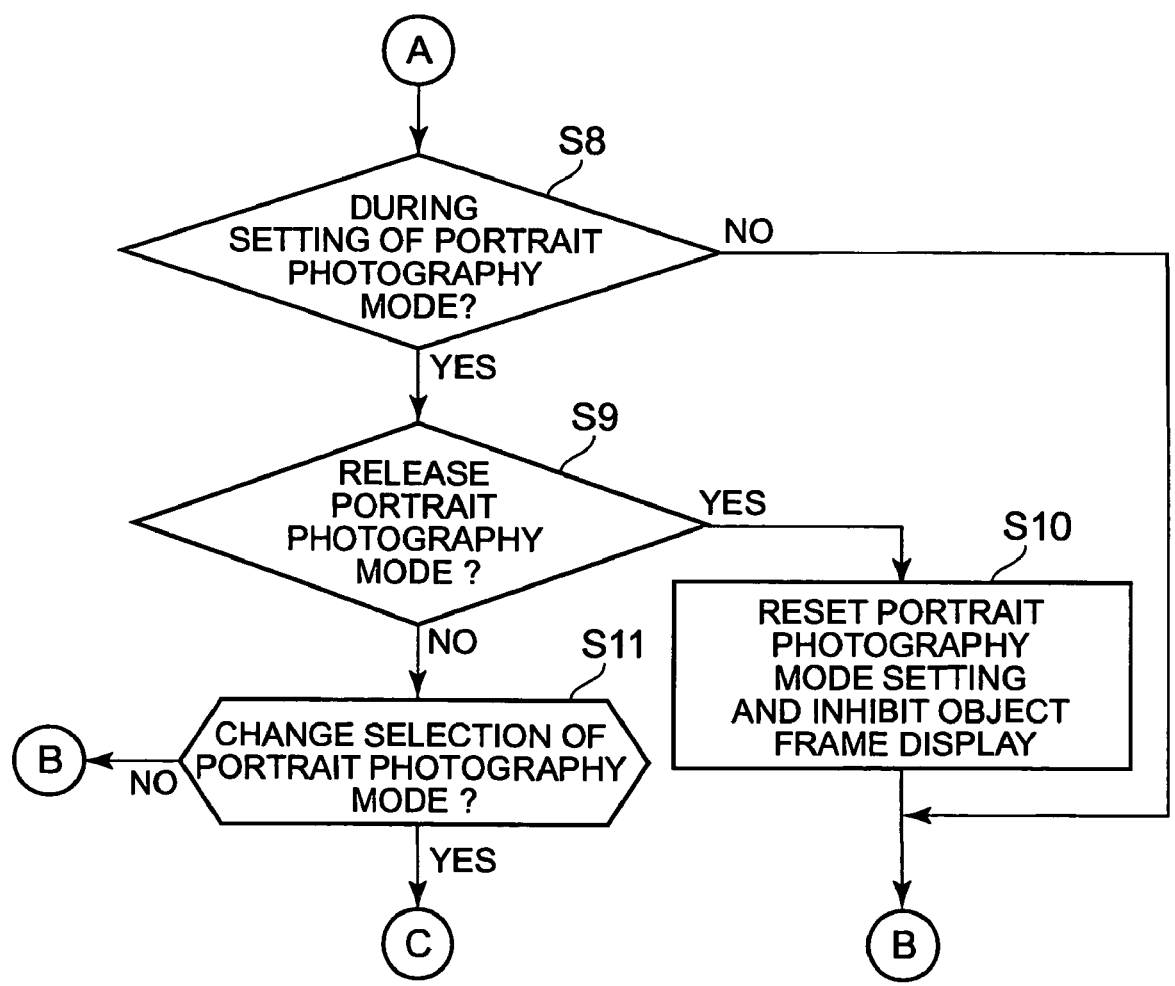
FIG. 4 is a flowchart showing an operation of the digital camera in the first embodiment.

At Step S7, when judged that the shutter button has not been depressed, the process advances to Step S8 of FIG. 4 and judges whether or not the current portrait photography mode has been set.

At Step S8, when judged that the portrait photography mode setting has not been executed, the process reverts to Step S2. When judged that the portrait photography mode setting has been executed, the process judges whether to release (cancel) the portrait photography mode (Step S9). This judgment judges whether or not a manipulation signal corresponding to manipulation of the release key on the user's key input section 13 has been sent from the key input section 13. When this signal has been sent, the process judges that the portrait photography mode has been canceled. For example, an instance when the user wants to photograph an object without displaying the object display frame. Also, when the portrait photography mode is manipulated in a situation where the last portrait photography mode has been selected, the portrait photography mode key may be canceled.

At Step S9, when judged that the portrait photography mode has been canceled, the process releases the portrait photography mode setting, inhibits the display of the object display frame on the image display section 12 (Step S10) and reverts to Step S2. At this stage, only the through-image of the object photographed by the CCD 5 is displayed on the image display section 12.

On the other hand, at Step S9, when judged that the portrait photography mode has not been released, the process judges whether or not to change selection of the portrait photography mode (Step S11). This judgment judges whether or not a manipulation signal corresponding to manipulation of the portrait photography mode key of the user's key input section 13 has been sent from the key input section 13. When this signal has been sent, the process judges that the portrait photography mode selection has been changed.

At Step S11, when judged that the portrait photography mode selection has not been changed, the process reverts to Step S2. When judged that the portrait photography mode selection has been changed, the process reverts to Step S5 and renews the setting of the selected portrait photography mode according to manipulation of the user's portrait photography mode key. For example, an instance when displaying the object display frame corresponding to the portrait photography mode 1 and the user wants to photograph an object (the entire object) which constitutes an object display frame corresponding to the portrait photography mode 3.

Figure 5:
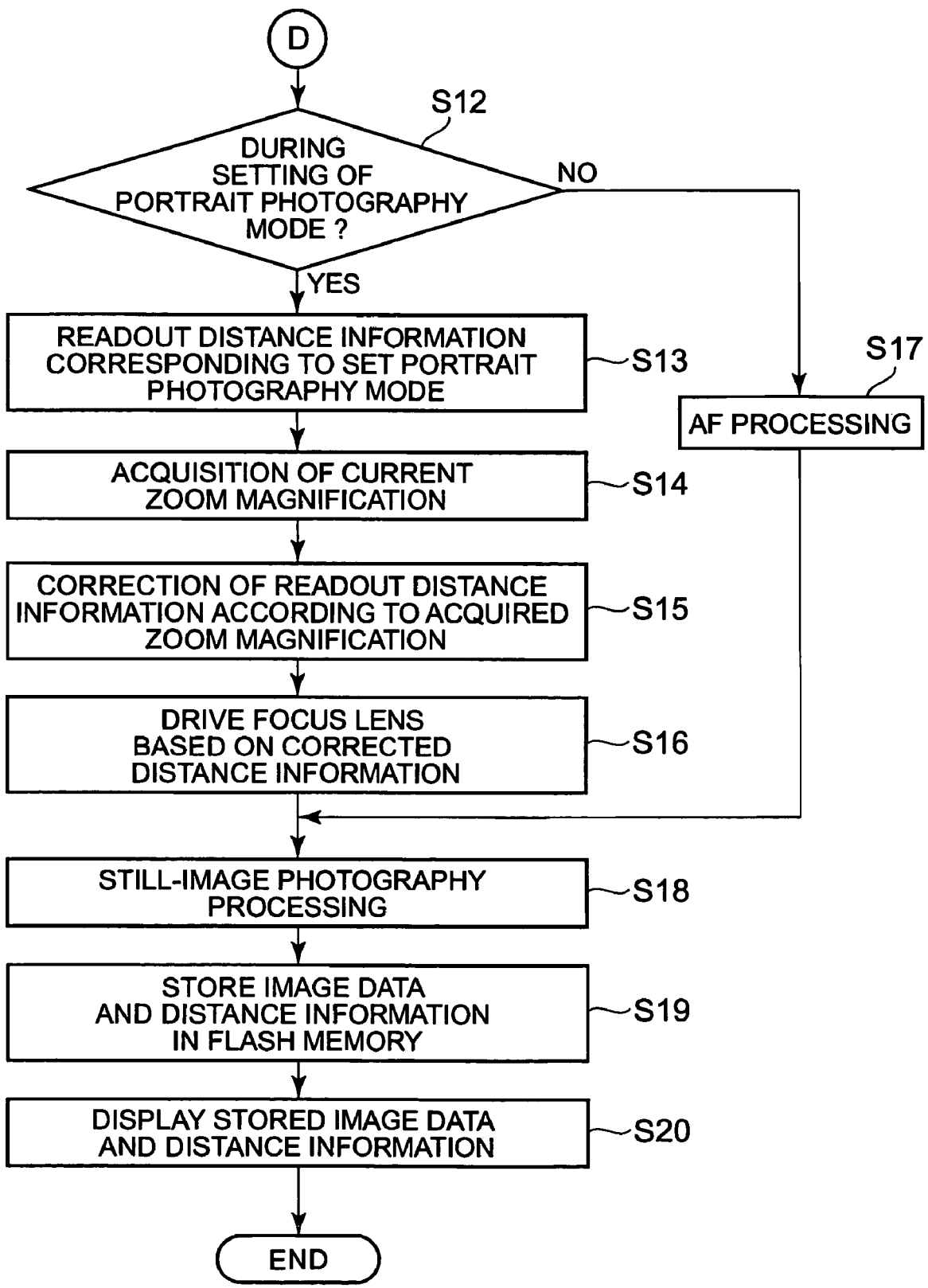
FIG. 5 is a flowchart showing an operation of the digital camera in the first embodiment.

On the other hand, at Step S7, when judged that the shutter button has been depressed by the user, the process advances to Step S12 of FIG. 5 and judges whether or not the current portrait photography mode has been set.

At Step S12, when judged that the portrait photography mode has been set, the process reads out the distance information corresponding to the set portrait photography mode from the distance information table stored in the memory 9 (Step S13).

Next, the process acquires the current zoom magnification from the position information for the zoom lens (Step S14).

Then, the process calculates the distance information (object distance information) to an object by correcting the distance information readout from the distance information table according to the acquired zoom magnification (Step S15). This is because the distance information stored in the distance information table is information which indicates the distance to a person (object) under the assumption that the person (object) currently displayed on the image display section 12 is the size equivalent to the object display frame corresponding to a respective portrait photography mode when zoom magnification is ×1 and zoom is not performed. The distance to the object will naturally change when zoom is performed.

Also, the digital camera 1 has a table with distance information recorded corresponding to portrait photography modes and zoom magnification in advance. According to the portrait photography mode and zoom magnification, distance information can be acquired from this table and this acquired distance information can be used as object distance information.

At Step S15, the process drives the focus lens based on the corrected (calculated) object distance information (Step S16) and advances to Step S18. Accordingly, the object fitted exactly in the object display frame will be appropriately focused.

On the other hand, when judged that the portrait photography mode setting has not been executed, after performing AF processing on an object (Step S17) the process advances to Step S18. When judged that the portrait photography mode setting has not been executed, since the object display frame has not been displayed on the image display section 12 and the distance to an object cannot be guessed, the focusing of an object is adjusted by normal AF processing. This AF processing method can be AF processing through an active method, AF processing according to a passive method (AF processing according to a phase difference detection method, etc.), AF processing through a contrast detection method, pan focusing which performs focusing on an object by moving the focus lens to a predetermined fixed focal point position or simple AF processing in which the number of lens positions of the focus lens for detecting the AF evaluation value is lower than that during normal AF processing.

When advancing to Step S18, the process performs still image photography processing relative to the photograph object wherein the image data acquired by this still image photography processing and the object distance information are correlated and recorded in the flash memory 11 (Step S19).

At this stage, the object distance information correlated with the still image data and recorded is the object distance information corrected in Step S15 when still image photography processing is performed by adjusting focus relative to an object in Step S16 of FIG. 5. When AF processing is executed at Step S17 and still image photography processing is performed, it is the object distance information acquired by the AF processing in Step S17. For example, in the case of the AF processing method in Step S17 of an active method or a passive method, the detected object distance information for performing AF processing is recorded. In the case of a contrast detection method, the acquired object distance information based on the lens position of the focus lens when performing focus on an object is recorded.

Next, the object distance information recorded by correlating an image of recorded image data in the flash memory 11 is displayed on the image display section 12 (Step S20).

A-4. Effect

As described above in the first embodiment, distance information corresponding to the set portrait photography mode and the current zoom magnification are obtained. Because object distance information is acquired by correcting the distance information according to this acquired zoom magnification, even when a photographic scene is dark focusing can be accurately performed on an object by adjusting the object being recorded by the user to match the object display frame corresponding to the portrait photography mode.

In addition, since the object distance information corresponding to the respective portrait photography modes is stored in advance, object distance information can be acquired rapidly and processing load of the CPU 10 can be reduced as compared with the conventional AF processing, etc.

Furthermore, because distance information corresponding to the portrait photography mode is acquired, there is no incorrect ranging or out-of-focus images because the user adjusts the object to be photographed in the object display frame.

B. Second Embodiment

Next, the second preferred embodiment will be explained.

B-1. Operation of the Digital Camera 1

The second preferred embodiment also actualizes the imaging apparatus of the present invention by using the digital camera 1 having the same configuration as the apparatus shown in FIG. 1.

However, the shutter button of the key input section 13 is a shutter button in which halfway depressed manipulation and fully depressed manipulation are possible and default focusing position information besides the distance information table is recorded in the memory 9.

The operations of the digital camera 1 of the second embodiment will be explained based on the flowcharts in FIG. 6 and FIG. 7.

When the power supply of the digital camera 1 is turned "ON" by manipulation of the power key of the user's key input section 13, imaging of an object commences by the CCD 5 and a through-image display commences, namely, a through-image of the imaged object is displayed on the image display section 12 (Step S51).

Next, the CPU 10 judges whether or not manipulation of the zoom keys of the user's key input section 12 has been executed (Step S52).

At Step S52, when judged that there has been a zoom key manipulation, the zoom lens will be driven according to the user's zoom key manipulation (Step S53) and the process advances to Step S54. When judged that zoom key manipulation has not been executed in Step S52, the process advances directly to Step S54.

When processing advances to Step S54, the CPU 10 judges whether or not selection of a portrait photography mode has been executed. At this stage, when a portrait photography mode has already been selected, a judgment of whether the portrait photography mode selection has been changed is also performed. This judgment judges whether or not a manipulation signal corresponding to the portrait photography mode key operation has been sent from the key input section 13.

When judged that a portrait photography mode selection has been performed in Step S54, the CPU 10 will set the selected portrait photography mode (Step S55). In other words, information indicating this selected portrait photography mode is stored in the portrait photography mode storage area of memory 9.

Also, when the portrait photography mode has been selected and a portrait photography mode has been reselected (namely, the portrait photography mode selection has been changed), the information indicating the portrait photography mode already stored in the portrait photography mode storage area of memory 9 is overwritten with the information indicating the latest selected portrait photography mode and stored.

Then, the CPU 10 displays the object display frame corresponding to the set portrait photography mode on the image display section 12 (Step S56) and the process advances to Step S57.

On the other hand, when judged that portrait a photography mode selection has not been performed in Step S54, the process advances directly to Step S57.

When processing proceeds to Step S57, the CPU 10 judges whether or not the shutter button has been halfway depressed by the user. This judgment judges whether or not a manipulation signal corresponding to the halfway depression of the shutter button has been sent from the key input section 13.

At Step S57, when judged that the shutter button has not been halfway depressed, the CPU 10 judges whether or not a portrait photography mode is currently set (Step S58). This judgment judges whether or not information indicating the portrait photography mode has been stored in the portrait photography mode storage area in the memory 9.

At Step S58, when judged that the portrait photography mode has not been currently set, the process reverts to Step S52. When judged that the portrait photography mode has been set in Step S58, the CPU 10 judges whether or not to release the portrait photography mode (Step S59).

At Step S59, when judged that release of the portrait photography mode will not be performed in Step S59, the process reverts to Step S52. When judged that release of the portrait photography mode will be performed in Step S59, the CPU 10 releases the portrait photography mode. Namely, the CPU 10 deletes the information indicating the portrait photography mode stored in the portrait photography mode storage area of the memory 9 and inhibits the display of the object display frame on the image display section 12 (Step S60) and the process reverts to Step S52.

On the other hand, when judged that the shutter button has been halfway depressed in Step S57, the CPU 10 starts AF processing (Step S61). Although this AF processing method can be AF processing according to an active method or AF processing according to a passive method, here AF processing according to a contrast detection method is adopted.

When AF processing has been started, the CPU 10 judges whether or not AF processing has been completed (Step S62).

At Step S62, when judged that the AF processing has not been completed, the CPU 10 judges whether or not the shutter button has been fully depressed by the user (Step S63). This judgment judges whether or not a manipulation signal corresponding to a fully depressed shutter button has been sent from the key input section 13.

At Step S63, when judged that the shutter button has not been fully depressed, the process reverts to Step S62.

Figure 7:
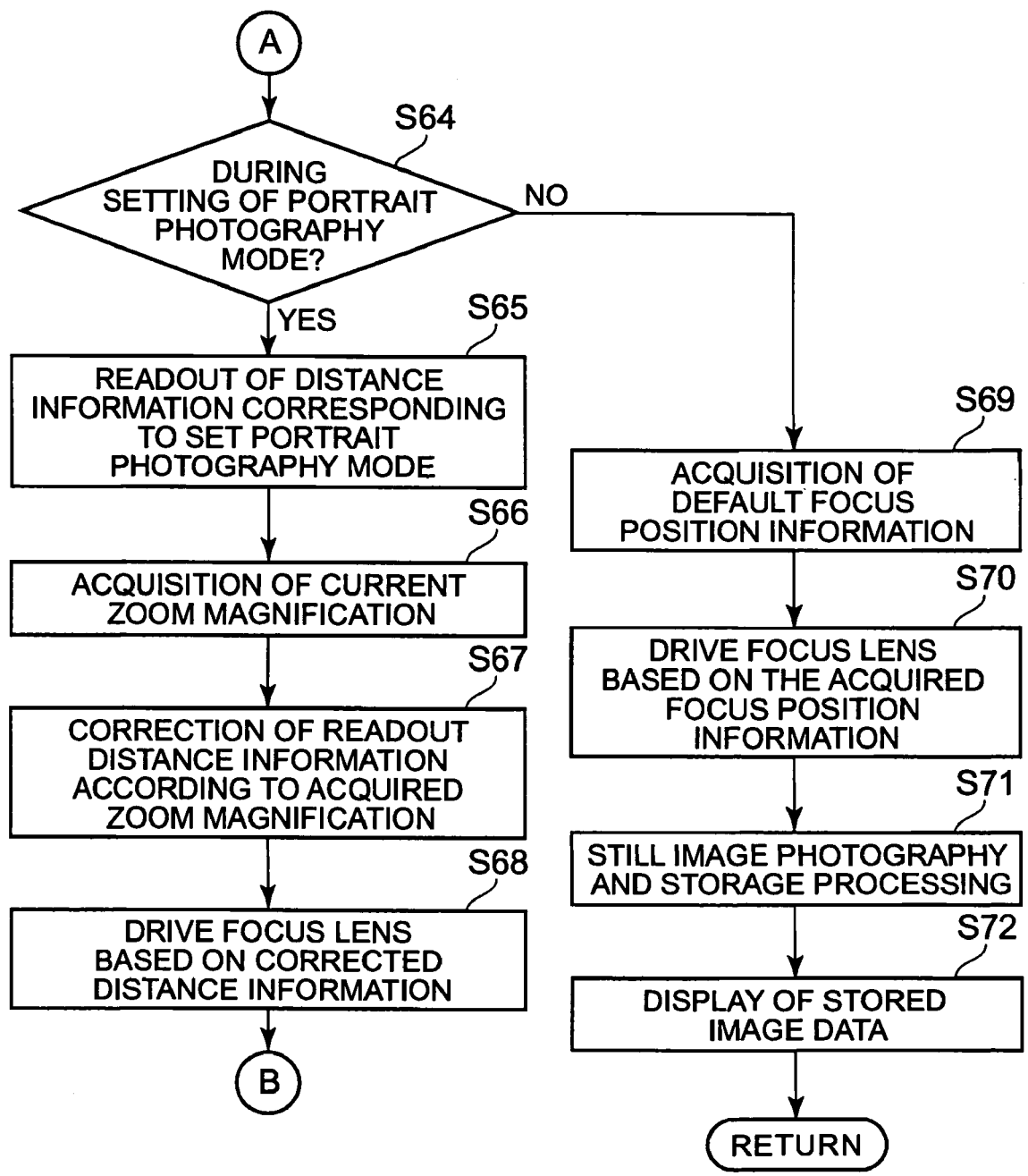
FIG. 7 is a flowchart showing operation of the digital camera in the second embodiment.

At Step S62 before judging that the AF processing has been completed, when judged that the shutter button has been fully depressed in Step S63, the process judges that the user requires fast photography and advances to Step S64 in FIG. 7. As a case in which the shutter button is fully depressed before AF processing has been completed, the user may have depressed the shutter button in one motion.

When processing advances to Step S64 in FIG. 7, the CPU 10 judges whether or not the portrait photography mode has been currently set. At this stage, the CPU 10 stops AF processing currently being performed.

At Step S64, when judged that the portrait photography mode has been currently set, the CPU 10 reads out the distance information corresponding to the set portrait photography mode from the distance information table stored in the memory 9 (Step S65).

Next, the CPU 10 acquires the current zoom magnification from the position information of the zoom lens (Step S66).

Then, the CPU 10 calculates the distance information to an object (object distance information) by correcting the distance information readout from the distance information table according to the acquired zoom magnification (Step S67).

The digital camera 1 has a table with distance information recorded corresponding to portrait photography modes and zoom magnification in advance. Accordingly, the process can acquire distance information from the table according to the portrait photography mode and zoom magnification and the acquired distance information can be used as the object distance information.

Figure 6:
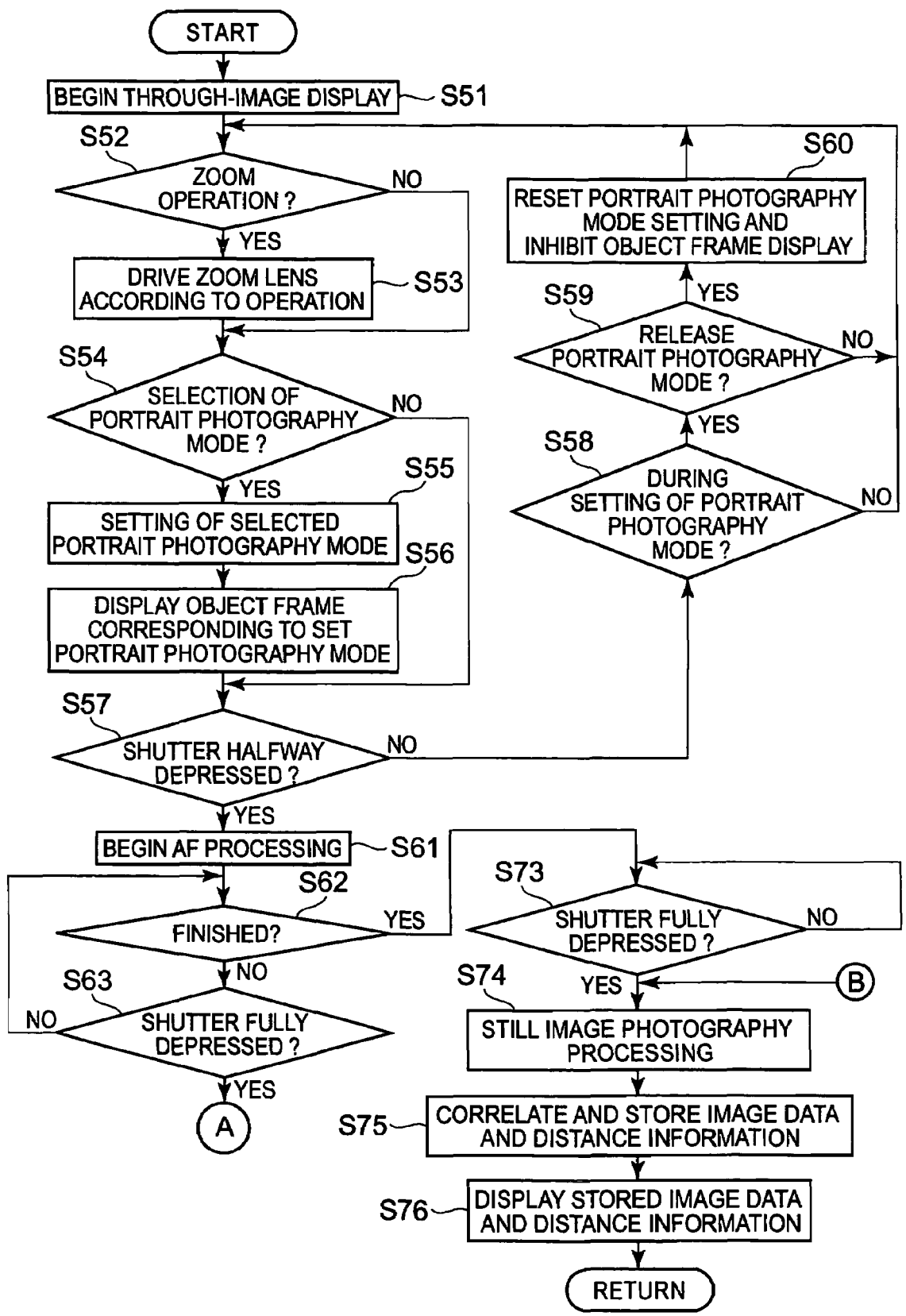
FIG. 6 is a flowchart showing operation of the digital camera in a second embodiment.

Then, the CPU 10 drives the focus lens based on this corrected object distance information (Step S68) and the process advances to Step S74 in FIG. 6. In this manner, the object to be photographed can be adjusted into focus.

On the other hand, at Step S64, when judged that a portrait photography mode has not been currently set, the CPU 10 reads out the default focusing position information (fixed focusing position information) from the memory 9 (Step S69). Then, the CPU 10 drives the focus lens based on the read default focusing position information, performs still image photography processing, records the still image data acquired from the photography processing to the flash memory 11 (Step S71) and displays the image of the recorded still image data on the image display section 12 (Step S72). Although pan focus processing is performed in Step S69 and S70, simple AF processing in which the number of lens positions of the focus lens for detecting the AF evaluation value is lower than that during normal AF processing (AF processing commenced at Step S61 in FIG. 6) can be performed as well.

On the other hand, at Step S62, when judged that AF processing has been completed, without judging that the shutter button has been fully depressed at Step S63, the CPU 10 judges whether or not the user has fully depressed the shutter button (Step S73). This judgment judges whether a manipulation signal corresponding to a full depression of the shutter button has been sent from the key input section 13.

At Step S73, the process remains at Step S73 until judged at Step S73 that the shutter button has not been fully depressed or has been fully depressed. When judged that the shutter button has been fully depressed at Step S73, the process advances to Step S74.

When processing proceeds to Step S74, the CPU 10 performs still image photography processing and the still image data acquired from the photography processing and the object distance information are correlated and recorded in the flash memory 11 (Step S75).

At this stage, the object distance information correlated with the still image data and recorded is the object distance information corrected in Step S67 when the still image photography processing is performed by adjusting focus relative to an object in Step S68 in FIG. 7. When the shutter button has been fully depressed at Step S73 and still image photography is performed, it is also the object distance information acquired by the AF processing in Step S61. For example, in the case of the AF processing method in Step S61 of an active method or a passive method, the detected distance information for performing AF processing is recorded. In the case of a contrast detection method, the acquired object distance information based on the lens position of the focus lens when performing focus on an object is recorded.

When the still image data and the distance data are correlated and recorded, the CPU 10 displays the image of the recorded still image data and the object distance based on the object distance information on the image display section 12 (Step S76).

B-2. Effect

As described above in the second embodiment, when judged the shutter button has been fully depressed before completion of AF processing commenced by the shutter button being halfway depressed, the process judges that fast photography is required. Since focus is based on distance information which corresponds to the set portrait photography mode and object distance information corresponding to zoom magnification. Even when a photographic scene is dark focusing can be accurately performed on an object and focus rapidly adjusted to an object by adjusting the object being recorded to match the object display frame corresponding to the portrait photography mode.

In addition, in a case where the user is requiring fast photography and the portrait photography mode has not been set, because focus is performed based on a predetermined fixed focus point position, the object can be rapidly adjusted into focus.

Furthermore, when the user does not require fast photography, since AF processing performs auto-focusing on an object, the object can be adjusted into focus with high-precision.

C. Modified Example 1

In addition, the following modified examples are possible for each of the above-mentioned preferred embodiments.

In the modified example 1, a focus position table is recorded in place of the distance information table recorded in the memory 9.

Figures 8A, 8B:
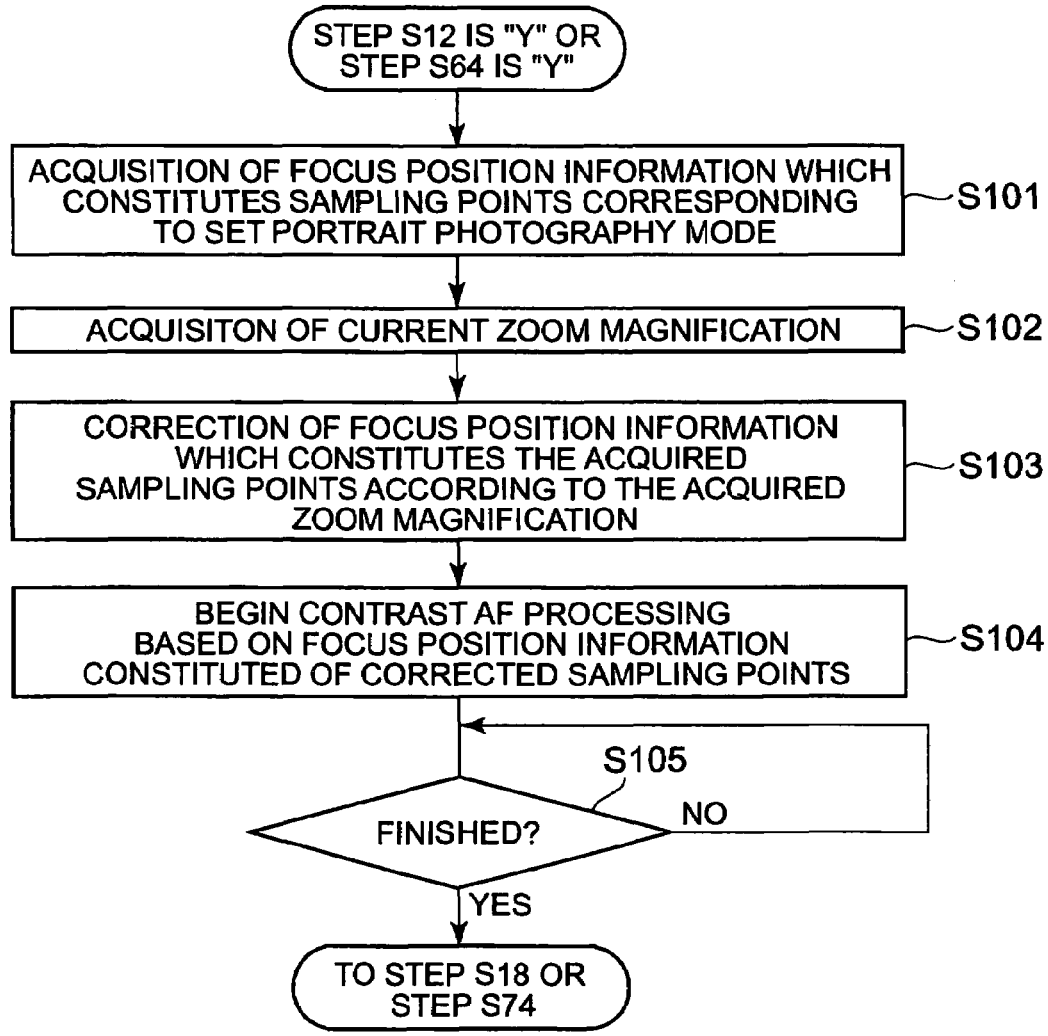
FIG. 8A and FIG. 8B are diagrams explaining a modified example 1.

FIG. 8A shows the state of the focusing position information table recorded in the memory 9. The three point focusing position information constitutes sampling points for each portrait photography mode which are recorded in this focus position table. The sampling points for each portrait photography mode are focus positions which are adjusted to an object distance corresponding to each portrait photography mode.

Next, the operations of the digital camera in the variant example 1 will be explained based on the flowchart in FIG. 8. Explanations regarding processing which are the same as those in the first and second embodiments are omitted.

When judged that a portrait photography mode has been currently set in Step S12 in FIG. 5 or a portrait photography mode has been currently set in Step 64 in FIG. 7, the process advances to Step S101 in FIG. 8, and the CPU 10 acquires three point focusing position information which are sampling points corresponding to the currently set portrait photography mode from the focus position table in memory 9.

For example, when the portrait photography mode set here is the portrait photography mode 3, the three point focusing position information to be acquired becomes: focusing position information with a depth of field of 1.5 m to 2.1 m; focusing position information with a depth of field of 1.8 m to 2.5 m; and focusing position information with a depth of field of 2.0 m to 2.7 m.

Next, the CPU 10 acquires the current zoom magnification from the position information of the zoom lens (Step S102).

Then, the CPU 10 performs correction on the acquired three point focusing position information which is sampling points according to the acquired zoom magnification (Step S103). This is because the focusing position also differs according to the zoom magnification.

The digital camera may be made to have a table to which the three point focusing position information is recorded in advance corresponding to the portrait photography mode and zoom magnification and may be made to acquire the three point corrected focusing position information from this table according to the portrait photography mode and zoom magnification.

Next, the CPU 10 starts AF processing according to a contrast detection method based on the three point focusing position information which are sampling points (Step S104).

The AF processing according to a contrast detection method is based on three point focusing position information which serves as these sampling points. Accordingly, the lens position of the focus lens to detect AF evaluation values (contrast values) by AF processing according to a contrast detection method is limited to these three corrected focus positions and drives the focus lens to a focus lens position where AF evaluation value is peak from among these.

Also, a search range table which records a search range for detecting AF evaluation values can be substituted for the focusing position table to which records a plurality of focusing position information composed of sampling points. Information indicating the search range for every portrait photography mode is recorded in the search range table.

In addition, AF processing through the contrast detection method can be performed based on the distance information table shown in FIG. 2E without providing a focusing position table, a search range table, etc.

In this case, after the focus lens is moved based on the object distance information corresponding to the portrait photography mode, the AF evaluation value for a total of three point focusing positions with the focusing position before and after are detected. Then, the focus lens is moved to the position in which AF evaluation value which is the peak from among the focus positions.

In addition, although there are three focusing position information which are sampling points, there may be any plural amount such as two, four, etc. In other words, it can be a simple AF processing in which the number of lens positions of the focus lens which detects the AF evaluation value is lower than that during normal AF processing.

Now returning to the flowchart in FIG. 8B, when AF processing according to the contrast detection method has been started and based on the corrected focusing position information which are sampling points, the CPU 10 judges whether or not AF processing has been completed (Step S105).

At Step S104, when judged that the AF processing has not been completed, the process remains in Step S105 until judged that the AF processing has been completed. When judged that the AF processing has been completed, the processing advances to Step S18 in FIG. 5 or Step S74 in FIG. 6, respectively.

In this manner, auto-focusing can be performed on an object rapidly and with high-precision.

D. Modified Example 2

The following modified example is also possible for the above-mentioned second preferred embodiment.

In the second preferred embodiment, when the shutter button is halfway depressed, AF processing will be started (Step S61 of FIG. 6). When the shutter button is fully depressed before AF processing has been completed (branches to "Y" at Step 63), namely, the shutter button has been fully depressed in one motion, the process judges that fast photography is required, but judgment as to whether or not the shutter button has been fully depressed may be judged by the next operation.

First, a first judgment of whether or not the shutter button has been fully depressed in one motion will be explained according to the flow chart in FIG. 9A.

Figure 9A:
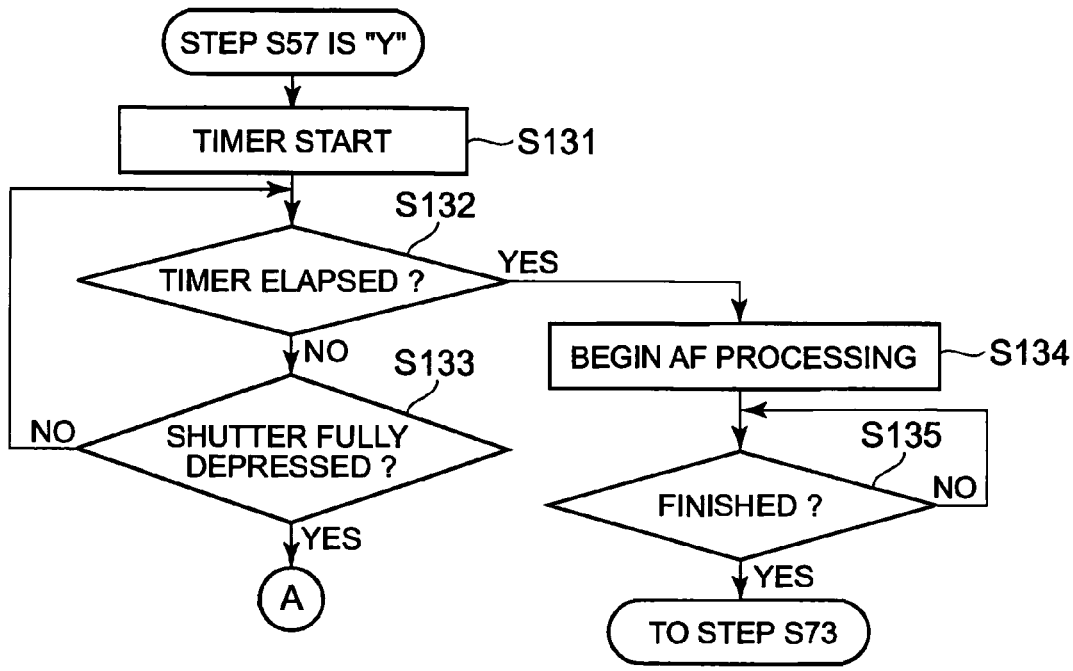
FIG. 9A and FIG. 9B are diagrams explaining a modified example 2.

When judged that the shutter button has been halfway depressed at Step S57 in FIG. 6, the process advances to Step S131 in FIG. 9A and the CPU 10 will start a timer.

Next, the CPU 10 judges whether or not timer has elapsed (Step S132). A judgment of whether or not the timer at a predetermined time has elapsed (here, 0.5 seconds).

At Step S132, when judged that time has not yet expired, (namely, when judged that the timer predetermined time has not elapsed), the CPU 10 judges whether or not the user has fully depressed the shutter button (Step S133).

When judged that the shutter button has not been fully depressed in Step S133, the process reverts to Step S132.

When judged that the shutter button has been fully depressed before the predetermined period of time has passed (branches to "Y" at Step S133), the CPU 10 judges that the shutter has been fully depressed in one motion and the process advances to Step S64.

On the other hand, when judged that the predetermined time has elapsed without the shutter button becoming fully depressed (branches to "Y" at Step S132), the process judges that the shutter button has been halfway without being fully depressed and the CPU 10 starts AF processing (here, AF processing according to contrast detection method is adopted) (Step S134). When the process judges that the AF processing has been completed (branches to "Y" at Step S135), the process advances to Step S73 in FIG. 6.

Next, a judgment of whether or not a second shutter button has been fully depressed in one motion will be explained according to the flow chart in FIG. 9B. Also, the flowchart in FIG. 9B is an operation which judges whether or not the shutter button has been fully depressed in one motion when a manipulation signal corresponding to a halfway depression of the shutter button cannot be detected by the CPU 10 unless the halfway depression state of the shutter button has been maintained for more than a fixed time.

Figure 9B:
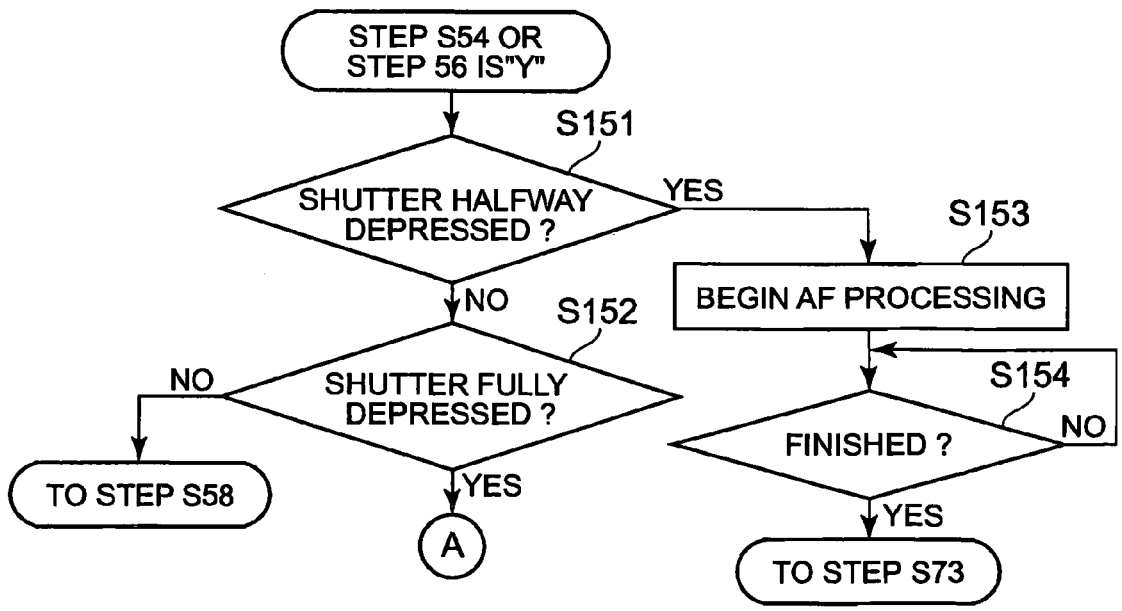

At Step S56 in FIG. 6, when the object display frame corresponding to the set portrait photography mode is displayed or when judged that the portrait photography mode has not been selected at Step S54, the process advances to Step S151 in FIG. 9B and judges whether or not the shutter button has been halfway depressed by the user.

At Step S151, when judged that the shutter button has not been halfway depressed, the CPU 10 judges whether or not the shutter button has been fully depressed (Step S152).

At Step S152, when judged that the shutter button has not been fully depressed, the process reverts to Step S58 in FIG. 6.

When judged that the shutter button has been fully depressed without judging that the shutter button has been halfway depressed (branches to "Y" at Step S152), the process judges that the shutter button has been fully depressed in one motion and the process advances to Step S64.

On the other hand, at Step S151, when judged that the shutter button has been halfway depressed, the process judges that the shutter button has been halfway depressed without being fully depressed and the CPU 10 starts the AF processing (here, AF processing according to a contrast detection method is adopted) (Step S153). When judged that AF processing has been completed (branches to "Y" at Step S154), the process advances to Step S73 in FIG. 6.

Also, the operation illustrated in the modified example 1 can be performed in the modified example 2.

Furthermore, when judged that the shutter button has been halfway depressed without being fully depressed (branches to "Y" at Step S132 or branches to "Y" at Step S151), the CPU 10 judges whether or not a portrait photography mode is currently set. When judged that a portrait photography mode has not been currently set, the CPU 10 starts AF processing at Step S134 or Step S153 and the process advances to Step S135 or Step S154, respectively. When judged that the portrait photography mode has been currently set, the process substitutes the AF processing in Step S134 or Step S154 and advances to Step S135 or Step S154 through operation of Step S101~Step S104 of FIG. 8B. In this way, even if the user does not require fast photography, when the portrait photography mode is set, focusing can be performed on an object rapidly and with high-precision.

Moreover, although the shutter button is a button having two stages of stroke operation which can be halfway depressed and fully depressed, it may also be a button with only one manipulation stage (a button without a two-stage stroke, namely a button that can only be depressed). In this case, a touch-sensor for detecting whether a finger has touched the upper section of the shutter button is provided. The shutter button is judged to be halfway depressed by detecting whether or not a finger has touched the touch sensor and the shutter button is judged to be fully depressed when the shutter button has been depressed.

E. Modified Example 3

In addition, the following modified examples are also possible for each of the above-mention preferred embodiments.

(1) Although a digital camera 1 having a zoom function is described in the present embodiment, this can be a digital camera with no zoom functions. In this case, the distance information corresponding to the acquired portrait photography mode is also the object distance information.

In addition, even when there is a zoom function, the zoom magnification corresponding to a respective portrait photography mode can be predetermined. When a portrait photography mode is selected, the zoom lens can be driven to become the zoom magnification corresponding to the portrait photography mode. In this case, the distance information corresponding to the portrait photography mode is distance information also takes into account the predetermined zoom magnification and the distance information corresponding to the acquired portrait photography mode is also the object distance information. In this way, the object distance information can be acquired even more rapidly and the load to the CPU 10 can be reduced.

(2) In addition, although a digital camera 1 having a plurality of portrait photography modes is described, it can also be a digital camera with only one portrait photography mode.

(3) Also, although the distance information table is stored in the memory 9 in advance, the distance information can be calculated from the size of the object display frame in the entire screen of the image display section 10. Then, this calculated distance information can be corrected according to the zoom magnification.

(4) Also, although the distance information table is stored in the memory 9 in advance, a position information table storing the focusing position information corresponding to respective portrait photography modes can be provided in place of the distance information table. Then, the position information of the focus lens can be corrected according to the zoom magnification from the focusing position information.

(5) Also, although a digital camera 1 having an optical zoom is described, the digital camera 1 can comprise an electrical zoom in place of the optical zoom. Further, the digital camera 1 can be equipped with both optical zoom and electrical zoom.

(6) Also, the object display frame itself may be zoomed and displayed on the image display section 10. In this case, the distance information corresponding to the portrait photography mode and zoom magnification can be performed on the current object, and furthermore, the object distance information can be calculated from the zoom magnification of the object display frame.

(7) Also, although the object display frame is a frame resembling a person's shape, the present invention is not limited to this. The object display frame may not resemble a human shape, for example, it may be an object display frame resembling a cat, an object display frame resembling a vehicle, etc. Accordingly, not only a human, but also a cat or other objects can be used to focus quickly. Even when the photographic scene is dark, incorrect ranging on these objects is not effected.

(8) Also, it is effective to simply display or record without using the acquired object distance information for focus processing.

(9) Furthermore, the foregoing (1) to (8) can be combined.

(10) The digital camera 1 in the above-mentioned preferred embodiments is not restricted to these embodiments. For example, the present invention can be a mobile phone with camera features, a PDA with camera features, a personal computer with camera features, an IC recorder with camera features, a digital video camera, etc. In short, any apparatus which can photograph an object is applicable.

While the present invention has been described with reference to the preferred embodiments, it is intended that the invention be not limited by any of the details of the description therein but includes all the embodiments which fall within the scope of the appended claims.

What is claimed is:

1. An imaging apparatus, comprising:
    an image pickup section for imaging an object;
    a setting section for setting a portrait photography mode;
    a display control section for displaying on a display section an object display frame corresponding to the portrait photography mode set by the setting section;
    an acquisition section for acquiring pan focus position information corresponding to the portrait photography mode set by the setting section;
    a control section for controlling a zoom magnification of the object;
    a first magnification acquisition section for acquiring the zoom magnification controlled by the control section;
    a correction section for correcting the pan focus position information corresponding to the portrait photography mode acquired by the acquisition section according to the zoom magnification acquired by the first magnification acquisition section; and
    a focus control section for focusing on the object by moving a focus lens based on the pan focus position information corrected by the correction section.

2. The imaging apparatus according to claim 1, wherein the display control section displays on the display section an image of image data picked up by the image pickup section with the object display frame.

3. The imaging apparatus according to claim 1, further comprising:
    a selection section for enabling a user to select an optional portrait photography mode from among a plurality of portrait photography modes; and
    wherein the setting section sets the portrait photography mode selected by the selection section.

4. The imaging apparatus according to claim 1, further comprising:
    a storage section for storing distance information corresponding to the portrait photography mode; and
    wherein the acquisition section reads out from the storage section the distance information corresponding to the portrait photography mode set by the setting section and acquires the pan focus position information corresponding to the readout distance information.

5. The imaging apparatus according to claim 1, further comprising:
a judgment section for judging whether the portrait photography mode has been set by the setting section; and
wherein the focus control section comprises a contrast AF section for detecting an AF rating value of image data picked up by the image pickup section while moving the focus lens, and the contrast AF section performs autofocusing on the object by moving the focus lens to a focus lens position where the AF rating value is maximum from among a plurality of detected AF rating values when the judgement section judges that the portrait photography mode has not been set.

6. An imaging apparatus comprising:
an image pickup section for imaging an object;
a setting section for setting a portrait photography mode;
a display control section for displaying on a display section an object display frame corresponding to the portrait photography mode set by the setting section;
an acquisition section for acquiring focusing position information corresponding to the portrait photography mode set by the setting section;
a focus control section for focusing on the object by moving a focus lens based on the focusing position information acquired by the acquisition section;
a zoom control section for zooming the object display frame displayed on the display section by the display control section; and
a magnification acquisition section for acquiring zoom magnification of the object display frame zoomed by the zoom control section;
wherein the acquisition section acquires the focusing position information corresponding to the portrait photography mode set by the setting section and the zoom magnification acquired by the magnification acquisition section.

7. An imaging apparatus comprising:
an image pickup section for imaging an object;
a setting section for setting a portrait photography mode;
a display control section for displaying on a display section an object display frame corresponding to the portrait photography mode set by the setting section;
an acquisition section for acquiring focusing position information corresponding to the portrait photography mode set by the setting section;
a focus control section for focusing on the object by moving a focus lens based on the focusing position information acquired by the acquisition section;
a control section for controlling a zoom magnification of the object;
a first magnification acquisition section for acquiring the zoom magnification controlled by the control section;
a zoom control section for zooming the object display frame displayed on the display section by the display control section;
a second magnification acquisition section for acquiring zoom magnification of the object display frame zoomed by the zoom control section; and
wherein the acquisition section acquires the focusing position information corresponding to the portrait photography mode set by the setting section and the zoom magnification acquired by the first magnification acquisition section and the second magnification acquisition section.

8. An imaging apparatus comprising:
an image pickup section for imaging an object;
a setting section for setting a portrait photography mode;
a display control section for displaying on a display section an object display frame corresponding to the portrait photography mode set by the setting section;
an acquisition section for acquiring focusing position information corresponding to the portrait photography mode set by the setting section;
a focus control section for focusing on the object by moving a focus lens based on the focusing position information acquired by the acquisition section;
a shutter button which can be halfway depressed and fully depressed;
a first judgment section for judging whether the shutter button has been halfway depressed; and
a second judgment section for judging whether the shutter button has been fully depressed in one motion;
wherein the focus control section focuses on the object by moving the focus lens based on the focusing position information acquired by the acquisition section when the second judgement section judges that the shutter button has been fully depressed in one motion.

9. The imaging apparatus according to claim 8, further comprising:
a third judgment section for judging whether the portrait photography mode has been set by the setting section when the second judgement section judges that the shutter button has been fully depressed in one motion; and
wherein the focus control section focuses on the object by moving the focus lens based on the focusing position information acquired by the acquisition section when the third judgement section judges that the portrait photography mode has been set.

10. The imaging apparatus according to claim 9, wherein the focus control section comprises a pan focusing control section for focusing on the object by moving the focus lens to a predetermined fixed focus position when the third judgement section judges that the portrait photography mode has not been set.

11. The imaging apparatus according to claim 8, further comprising a contrast AF control section for detecting an AF rating value of image data picked up by the image pickup section while moving the focus lens,
wherein the contrast AF control section performs autofocusing on the object by moving the focus lens to a focus lens position where an AF rating value is maximum from among a plurality of detected AF rating values when the first judgement section judges that the shutter button has been halfway depressed.

12. The imaging apparatus according to claim 11, wherein the contrast AF control section includes a section which controls detection of the AF rating values and which limits the lens position of the focus lens so as to detect the AF rating values based on the focusing position information acquired by the acquisition section when it is judged that the portrait photography mode has been set by the setting section and when the first judgement section judges that the shutter button has been halfway depressed.

13. The imaging apparatus according to claim 11, further comprising:
a fourth judgment section for judging whether the shutter button has been fully depressed before AF control has been completed according to the contrast AF control section; and
wherein the second judgment section judges that the shutter button has been fully depressed in one motion when the fourth judgement section judges that the shutter button has been fully depressed before the AF control is completed according to the contrast AF control section.

14. The imaging apparatus according to claim 8, wherein the second judgment section judges that the shutter button has been fully depressed in one motion when the shutter button is fully depressed before a predetermined time has elapsed after the shutter button has been halfway depressed; and wherein the first judgment section judges that the shutter button has been halfway depressed when the predetermined time elapses without fully depressing the shutter button after the shutter button has been halfway depressed.

15. The imaging apparatus according to claim 8, wherein the second judgment section judges that the shutter button has been fully depressed in one motion when it is judged that the shutter button has been fully depressed without the first judgement section judging that the shutter button has been halfway depressed.

16. An imaging apparatus, comprising:
an image pickup section for imaging an object;
a setting section for setting a portrait photography mode;
a display control section for displaying on a display section an object display frame corresponding to the portrait photography mode set by the setting section;
an acquisition section for acquiring predetermined focusing position information corresponding to the portrait photography mode set by the setting section;
a control section for controlling a zoom magnification of the object;
a first magnification acquisition section for acquiring the zoom magnification controlled by the control section;
a correction section for correcting the predetermined focusing position information corresponding to the portrait photography mode acquired by the acquisition section according to the zoom magnification acquired by the first magnification acquisition section; and
a recording control section for recording the predetermined focusing position information corrected by the correction section in a recording section.

17. The imaging apparatus according to claim 16, wherein the recording control section records the predetermined focusing position information corrected by the correction section and an association of the corrected predetermined focusing position information to image data obtained by the image pickup section, in the recording section.

18. An imaging apparatus, comprising:
an image pickup section for imaging an object;
a setting section for setting a portrait photography mode;
a display control section for displaying on a display section an object display frame corresponding to the portrait photography mode set by the setting section;
an acquisition section for acquiring predetermined object distance information corresponding to the portrait photography mode set by the setting section;
a control section for controlling a zoom magnification of the object;
a first magnification acquisition section for acquiring the zoom magnification controlled by the control section; and
a correction section for correcting the object distance information corresponding to the portrait photography mode acquired by the acquisition section according to the zoom magnification acquired by the first magnification acquisition section;
wherein the display control section further displays the object distance information corrected by the correction section on the display section.

19. The imaging apparatus according to claim 18, wherein the display control section displays the object distance information corrected by the correction section together with image data obtained by the image pickup section on the display section.

20. An imaging apparatus,
comprising: an image pickup means for imaging an object;
a setting means for setting a portrait photography mode;
a display control means for displaying on a display section an object display frame corresponding to the portrait photography mode set by the setting means;
an acquisition means for acquiring pan focus position information corresponding to the portrait photography mode set by the setting means;
a control means for controlling a zoom magnification of the object;
a first magnification acquisition means for acquiring the zoom magnification controlled by the control means;
a correction means for correcting the pan focus position information corresponding to the portrait photography mode acquired by the acquisition means according to the zoom magnification acquired by the first magnification acquisition means; and
a focus control means for focusing on the object by moving a focus lens based on the pan focus position information corrected by the correction means.

21. A focusing method comprising:
setting a portrait photography mode;
displaying on a display section an object display frame corresponding to the set portrait photography mode;
acquiring pan focus position information corresponding to the set portrait photography mode;
controlling a zoom magnification of an object;
acquiring the controlled zoom magnification;
correcting the acquired pan focus position information corresponding to the set portrait photography mode according to the acquired zoom magnification; and
focusing on the object by moving a focus lens based on the corrected pan focus position information.

22. A computer readable medium having stored thereon a computer program for an imaging apparatus, the computer program being executed by a processor in the imaging apparatus to perform functions comprising:
imaging an object;
setting a portrait photography mode;
displaying on a display section an object display frame corresponding to the set portrait photography mode;
acquiring pan focus position information corresponding to the set portrait photography mode;
controlling a zoom magnification of the object;
acquiring the controlled zoom magnification;
correcting the acquired pan focus position information corresponding to the set portrait photography mode according to the acquired zoom magnification; and
focusing on the object by moving a focus lens based on the corrected pan focus position information.

* * * * *